E. C. WALDORF.
POST HOLE DIGGER.
APPLICATION FILED AUG. 9, 1915.
1,182,724.
Patented May 9, 1916.
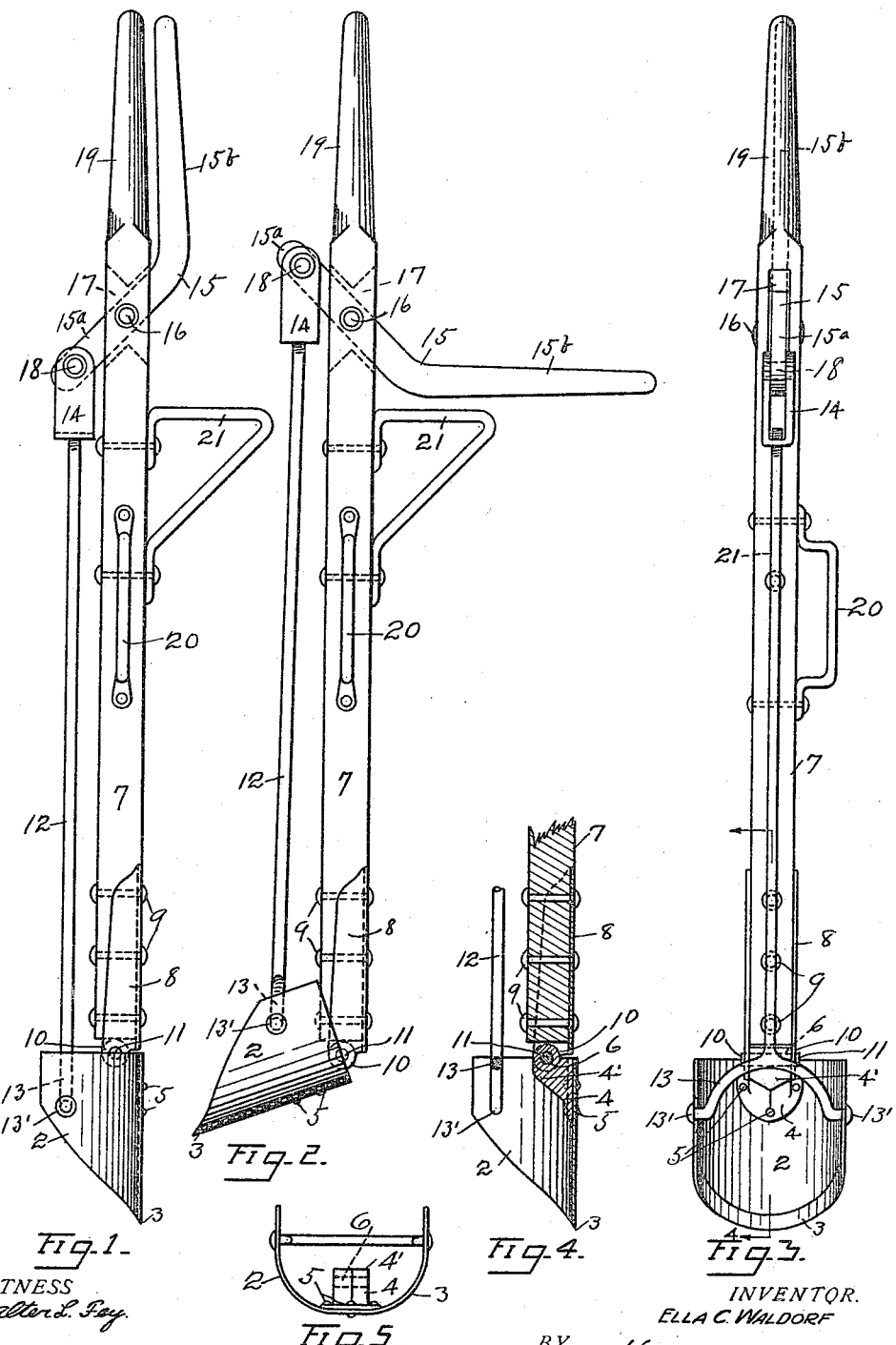
WITNESS
Walter L. Fay.
INVENTOR.
ELLA C. WALDORF
BY
Harry D. Wallace
ATTORNEY.

UNITED STATES PATENT OFFICE.

ELLA C. WALDORF, OF WATERTOWN, NEW YORK.

POST-HOLE DIGGER.

1,182,724.  Specification of Letters Patent.  Patented May 9, 1916.

Application filed August 9, 1915. Serial No. 44,447.

*To all whom it may concern:*

Be it known that I, ELLA C. WALDORF, a citizen of the United States, residing at Watertown, in the county of Jefferson and State of New York, have invented certain new and useful Improvements in Post-Hole Diggers, of which the following is a specification.

This invention relates to improvements in excavating devices and the invention relates particularly to a tool for digging post-holes and the like.

The object of the invention is to provide a novel, simple and convenient tool of the class, adapted particularly for manual use, having a semi-cylindrical scoop or shovel, which is employed for cutting and shaping holes in the earth, the said scoop being pivotally mounted upon one end of a rigid stock or handle and capable of being moved and set in different positions relatively to the stock for first cutting or digging a hole, and then removing the loose dirt therefrom.

A further object is to provide novel, simple and powerful means for operating the scoop. And a further object is to generally improve and simplify the construction of post-hole diggers and like excavating tools.

The various features and parts of the invention will be understood from the detailed description which follows and by reference to the accompanying drawing, in which—

Figure 1 is a side elevation of the complete device, ready for digging a hole in the earth. Fig. 2 is a similar view; showing the hinged-scoop adjusted for elevating and removing the loose dirt from the hole. Fig. 3 is a front view of the device shown in Fig. 1. Fig. 4 is a central longitudinal section, taken on line 4—4 of Fig. 3. Fig. 5 is a view of the cutting end of the device.

In the drawing, 2 represents a semi-cylindrical scoop or shovel, preferably made of sheet-metal or other suitable metal, one end of the scoop being tapered and having a chisel-like cutting edge 3, while the opposite end is disposed substantially at right angles to the longitudinal axis of the scoop. 4 represents a hinge-member, which is preferably mounted centrally on the inner side of the scoop above the cutting edge 3, the said member being rigidly secured to the scoop by rivets 5, and provided with a raised portion 4' having a transverse eye 6.

The scoop or shovel 2 is adjustably secured to one end of a relatively long wooden stock 7, by means of a second hinge-member, which comprises a cast or other metal channel-shaped part 8, which receives the end of the stock, and is secured thereto by rivets or bolts 9, the free end of the member 8 being provided with spaced perforated lugs 10, which straddle the raised portion 4' of the member 4. The hinge-members 4 and 8 are pivotally connected by a pin 11. By this arrangement of the said parts, the scoop is allowed a rotary movement of substantially 90° on the pivot 11.

While the cutting or chopping of a hole is being done, the scoop-digger 2 is held in alinement with the stock 7, as shown in Figs. 1, 3 and 4, and when it is desired to remove the loose earth from the hole, the scoop 2, while its point 3 is still at the bottom of the hole, is tilted forwardly and upwardly, as shown in Fig. 2. This partial rotation of the scoop gathers most of the loose dirt into the scoop, after which it is a simple matter for the operator to lift the tool vertically out of the hole, discharge the dirt from the scoop, and then shift the scoop back into the digging position, shown in Fig. 1.

The tilting and adjusting of the scoop is accomplished in the following manner: 12 represents a rod which extends along the front side of the stock 7, the lower end of said rod being formed into a yoke 13, and the ends of the yoke piercing the opposite sides of the scoop, as at 13'. The upper end of the rod 12 is threaded and screwed into one end of a clevis or head 14. 15 represents a lever, having a short arm 15ª, which passes through and is pivoted by a pin or bolt 16, in a slot 17 of the stock 7. The free end of the arm 15ª of said lever is positioned in the split-end of the clevis 14, to which it is pivoted by a pin or bolt 18. The long arm 15ᵇ of the lever 15 comprises a handle which, during the cutting or chopping operation, is positioned alongside or parallel to the tapered handle portion 19 of the stock. During the interval in which the operator is chopping or cutting the earth, his right-hand grasps the handle 19 of the stock and also the handle 15ᵇ of the lever 15, while at the same time his left-hand grasps a hand-iron 20, which is mounted on the one side of the stock 7, about midway between its ends. After several downward strokes of the tool have been made for loosening the earth, the operator takes hold of the handle 15ᵇ of the lever and swings it outwardly and downwardly, from the position shown in Fig. 1 to that shown in Fig. 2. This movement of the lever 15, through its connection with the clevis 14, pulls upwardly on rod 12, which tilts the scoop 2 forwardly and upwardly, as shown in Fig. 2, for loading the same with loose dirt which lies at the bottom of the excavation. After the scoop has been filled with loose dirt, the operator grasps the lever 15ᵇ while in its extended position and with the same hand, he also grasps a stationary hand-iron 21 (see Fig. 2), which is mounted on the rear side of the stock 7, and with his other hand still grasping the handle 20, he lifts the tool and the loose earth upwardly clear of the hole. The load of earth is then dumped, and the lever 15 swung back to the position shown in Fig. 1, which restores the scoop to the digging position, as described. These operations are repeated until the hole is dug the required depth. By the provision of the stationary hand-iron 21, the operator can very readily and effectually hold the scoop with its load of earth while the same is being elevated.

It is obvious that the scoop or shovel 2 may be made to various shapes and sizes, and the rod 12, by reason of the threads on its upper end may be so adjusted that the scoop may be shifted and held at different angles relatively to the stock and other modifications may be made in the parts of the device, within the scope defined by the appended claim, without departing from the spirit of the invention.

Having thus described my invention, what I claim as new and desire to secure by Letters Patent, is—

In an excavating tool, the combination with the stock having a hinged member at one end and having a slot near its other end, and a scoop for cutting and shaping a hole in the earth pivoted to said hinged member, of a lever pivoted in said slot, a rod pivoted to the scoop, a clevis for pivotally connecting said lever with said rod, said clevis being adjustably connected to said rod for varying the movements of said scoop, and a hand-iron adapted to be grasped by the operator's hand which depresses the said lever for holding the scoop at right angles to the stock.

In testimony whereof I affix my signature in presence of a witness.

ELLA C. WALDORF.

Witness:
GEORGE S. HOOKER.